United States Patent
Magnuson et al.

(10) Patent No.: US 10,549,293 B2
(45) Date of Patent: Feb. 4, 2020

(54) SYSTEM FOR APPLYING PIPE DOPE TO EXTERNAL THREADS OF A PIPE

(71) Applicant: NABORS INDUSTRIES, INC., Houston, TX (US)

(72) Inventors: Christopher Magnuson, Houston, TX (US); Enrique Abarca, Houston, TX (US)

(73) Assignee: NABORS INDUSTRIES, INC., Houston, TX (US)

(*) Notice: Subject to any disclaimer, the term of this patent is extended or adjusted under 35 U.S.C. 154(b) by 21 days.

(21) Appl. No.: 15/480,164

(22) Filed: Apr. 5, 2017

(65) Prior Publication Data

US 2017/0209889 A1 Jul. 27, 2017

Related U.S. Application Data

(62) Division of application No. 14/471,810, filed on Aug. 28, 2014, now Pat. No. 9,643,206.

(Continued)

(51) Int. Cl.
*F16N 5/02* (2006.01)
*B05B 13/02* (2006.01)
(Continued)

(52) U.S. Cl.
CPC ............ *B05B 7/2486* (2013.01); *A46B 11/06* (2013.01); *B05B 9/0409* (2013.01); *B05B 12/082* (2013.01); *B05B 13/0207* (2013.01); *B05C 1/027* (2013.01); *B05D 1/02* (2013.01); *B29C 45/14598* (2013.01); *E21B 17/003* (2013.01); *E21B 17/042* (2013.01); *F16N 5/02* (2013.01);
(Continued)

(58) Field of Classification Search
CPC . F16N 7/12; F16N 5/02; B05C 5/0241; B05B 12/082; B05B 7/2486; B05B 13/0207
See application file for complete search history.

(56) References Cited

U.S. PATENT DOCUMENTS

| | | | | |
|---|---|---|---|---|
| 1,671,620 A | * | 5/1928 | Von Marchthal | B41C 1/186 101/401.1 |
| 4,095,674 A | * | 6/1978 | Kido | F16H 57/0456 184/15.2 |

(Continued)

FOREIGN PATENT DOCUMENTS

WO WO-2013032343 A1 * 3/2013 ........... E21B 17/006

*Primary Examiner* — Karl Kurple
(74) *Attorney, Agent, or Firm* — Adolph Locklar

(57) ABSTRACT

A pipe doping system for applying pipe dope to the external threads of a pin end member may comprise a pump fluidly coupled to a dope-containing reservoir and a dope manifold, the pump positioned to pump pipe dope from the reservoir to the dope manifold; an ejector coupled to the dope manifold and positioned to supply a fixed volume of pipe dope from the dope manifold to a dope distribution line; a dope applicator, the dope applicator fluidly coupled to a dope distribution line positioned to deposit pipe dope on the external threads, the dope applicator being located apart from the ejector and including a nozzle positioned to receive a flow of pipe dope from the dope distribution line and apply the pipe dope onto the threaded connection. The system may include a power source to increase the pressure of the pipe dope as it is dispensed by the ejector.

10 Claims, 4 Drawing Sheets

Related U.S. Application Data

(60) Provisional application No. 61/880,562, filed on Sep. 20, 2013.

(51) Int. Cl.

| | | |
|---|---|---|
| *B05B 12/08* | (2006.01) | |
| *B05B 7/24* | (2006.01) | |
| *B05B 9/04* | (2006.01) | |
| *B05C 1/02* | (2006.01) | |
| *B29C 45/14* | (2006.01) | |
| *B05D 1/02* | (2006.01) | |
| *A46B 11/06* | (2006.01) | |
| *E21B 17/00* | (2006.01) | |
| *E21B 17/042* | (2006.01) | |
| *B05C 11/10* | (2006.01) | |
| *B05C 1/06* | (2006.01) | |
| *B05B 15/55* | (2018.01) | |
| *B29L 9/00* | (2006.01) | |
| *B05B 15/555* | (2018.01) | |

(52) U.S. Cl.
CPC ............. *B05B 15/55* (2018.02); *B05B 15/555* (2018.02); *B05C 1/06* (2013.01); *B05C 11/1015* (2013.01); *B05D 2254/02* (2013.01); *B29L 2009/005* (2013.01)

(56) References Cited

U.S. PATENT DOCUMENTS

| | | | | |
|---|---|---|---|---|
| 4,199,858 A * | 4/1980 | Meijs | ........... | E21B 17/006 166/243 |
| 4,312,424 A * | 1/1982 | Taylor | ........... | F16N 27/00 180/8.5 |
| 4,372,245 A * | 2/1983 | Watson | ........... | B05C 7/06 118/105 |
| 4,426,410 A * | 1/1984 | Watson | ........... | B05C 7/06 427/231 |
| 4,467,892 A * | 8/1984 | Van de Bogert | ...... | F16N 29/00 184/6 |
| 4,653,610 A * | 3/1987 | Tamura | ........... | E02B 17/0818 118/254 |
| 4,858,645 A * | 8/1989 | Reeves | ........... | F04B 49/106 137/551 |
| 4,932,801 A * | 6/1990 | Osborne | ........... | B05C 3/20 118/428 |
| 5,322,571 A * | 6/1994 | Plummer | ........... | A62C 33/02 134/22.12 |
| 5,477,941 A * | 12/1995 | Kumar | ........... | B61C 15/107 184/3.2 |
| 5,518,076 A * | 5/1996 | Holz | ........... | E21B 17/006 166/243 |
| 6,305,393 B1 * | 10/2001 | Lin | ........... | B08B 3/026 134/102.2 |
| 6,550,547 B1 * | 4/2003 | Payne | ........... | E21B 19/15 175/24 |
| 6,557,651 B1 * | 5/2003 | Norby | ........... | E21B 17/006 175/52 |
| 6,589,343 B1 * | 7/2003 | Egeland | ........... | E21B 17/006 118/313 |
| 6,602,554 B1 * | 8/2003 | Kwok | ........... | B05B 7/0884 427/424 |
| 6,742,625 B2 * | 6/2004 | Rodemer | ........... | B65G 45/08 184/15.2 |
| 6,997,992 B2 * | 2/2006 | Nesbitt | ........... | B05B 12/12 118/663 |
| 7,963,371 B2 * | 6/2011 | Belik | ........... | F16N 7/32 118/105 |
| 7,975,805 B2 * | 7/2011 | Wech | ........... | F16N 17/04 184/104.1 |
| 8,025,024 B2 * | 9/2011 | Halse | ........... | E21B 19/161 118/313 |
| 8,893,644 B2 * | 11/2014 | Nakamura | ........... | B05B 1/044 118/24 |
| 2003/0049385 A1 * | 3/2003 | Barnes | ........... | B05C 17/02 118/105 |
| 2004/0140159 A1 * | 7/2004 | Belik | ........... | B05B 3/1021 184/14 |
| 2006/0076193 A1 * | 4/2006 | Ruther | ........... | F01M 1/08 184/6.12 |
| 2007/0214855 A1 * | 9/2007 | Hiraishi | ........... | B21B 19/04 72/69 |
| 2008/0121174 A1 * | 5/2008 | Halse | ........... | E21B 17/006 118/300 |
| 2008/0223418 A1 * | 9/2008 | Vatne | ........... | E21B 17/006 134/99.1 |
| 2009/0264326 A1 * | 10/2009 | Imai | ........... | C10M 169/04 508/100 |
| 2010/0133353 A1 * | 6/2010 | Herre | ........... | B05B 12/1409 239/1 |
| 2011/0111124 A1 * | 5/2011 | Pawelski | ........... | B21B 27/10 427/255.25 |
| 2012/0034376 A1 * | 2/2012 | Nakamura | ........... | B05B 13/0442 427/233 |
| 2015/0377412 A1 * | 12/2015 | Dann | ........... | F16N 3/00 184/28 |
| 2016/0047180 A1 * | 2/2016 | Belik | ........... | E21B 17/006 166/77.52 |

* cited by examiner

SYSTEM FOR APPLYING PIPE DOPE TO EXTERNAL THREADS OF A PIPE

CROSS-REFERENCE TO RELATED APPLICATIONS

This application is a divisional application which claims priority from U.S. nonprovisional application Ser. No. 14/471,810, filed Aug. 28, 2014, which itself claims priority from U.S. provisional application No. 61/880,562, filed Sep. 20, 2013, each of which is hereby incorporated by reference in its entirety.

TECHNICAL FIELD/FIELD OF THE DISCLOSURE

The present disclosure relates to the application of lubricant to threaded pipe connections.

BACKGROUND OF THE DISCLOSURE

The exploration and production of hydrocarbons require the use of drilling systems that include tubulars such as drill pipes, casings, and other threadedly connected elements used in the well structures. The connection of "strings" of joined tubulars, or drill strings, is typically used to drill a wellbore and with regard to casing prevent collapse of the wellbore after drilling. These tubulars are normally assembled in groups of two or more commonly known as "stands" to be vertically stored in the derrick or mast.

On a drilling rig, the drill string may be assembled in the derrick or mast. The drill string may be run downhole and into the wellbore. The drill string may be used to transmit rotational power to the drill bit located at its lower end. The drill string may also be used to transmit drilling fluid, commonly known as mud, down through the internal bore in the drill string. The mud exits at or near the drill bit and then circulates back up the well annulus between the drill string and the well bore. The drill pipe string may also run casing, a liner, or a landing string downhole. The drill string may also be used for work-over activity of a hydrocarbon well. Drill strings are only limited in length by material limitations, which is constantly being improved to allow for drilling deeper and having longer deviated or horizontal drilled wells.

The drill string is comprised of tubulars threaded and connected together by their threaded ends. A joint or segment of a drill pipe may vary in length. A joint or segment of drill pipe is comprised of a female connection, known as the "box" and a male section known as the "pin". The box end is internally threaded and adapted to receive the pin end member of another drill pipe joint, which has external threads. Building the joints of drill pipe may be conducted by interconnecting the threads to make up the drill string. The drill string may be securely made up to, for example, prevent leakage, wobbling, or unscrewing, resulting in a lost well. Typically, power tongs or automated roughnecks are used to transmit sufficient torque to the pipe joints to ensure that the pin is securely tightened to the box. The amount of torque required to securely tighten the tubulars is known as make-up torque. The amount of torque required depends in part on the specific frictional properties of the threaded connections. The ability to impart higher friction coefficient may decrease the amount of torque to be transmitted and greatly reduces the instances of tool joints unscrewing. A lower friction coefficient may allow more torque to be transmitted which may result in too much torque applied when making up the joints. Excessive torque could stretch or burst the box member or crack or break the pin member.

Anti-seizing material known in the industry as "pipe dope" may be applied to the threaded connections of the joints to maintain a high coefficient of friction. The dope may assist with make-up and break-out operations by reducing required torque.

Typically, rig personnel manually apply pipe dope to the threaded pipe connections. This operation may be time consuming and dangerous for the rig personnel.

SUMMARY

The present disclosure provides for a pipe doping apparatus. The pipe doping apparatus may include a pump fluidly coupled to a reservoir and a dope manifold, the pump positioned to pump pipe dope from the reservoir to the dope manifold; an ejector coupled to the dope manifold, the ejector positioned to supply a fixed volume of pipe dope from the dope manifold to a dope distribution line; and a pipe dope applicator, the pipe dope applicator fluidly coupled to the dope distribution line positioned to deposit pipe dope on a threaded connection.

The present disclosure also provides for a method of applying pipe dope to a threaded connection. The method may include providing a pipe doping apparatus. The pipe doping apparatus may include a pump fluidly coupled to a reservoir and a dope manifold, the pump positioned to pump pipe dope from the reservoir to the dope manifold, an ejector coupled to the dope manifold, the ejector positioned to supply a fixed volume of pipe dope from the dope manifold to a dope distribution line, and a pipe dope applicator, the pipe dope applicator fluidly coupled to the dope distribution line positioned to deposit pipe dope on a threaded connection. The method may further include positioning the pipe doping apparatus to engage with the threaded connection; aligning the threaded connection with the pipe dope applicator; and actuating the pipe dope applicator.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
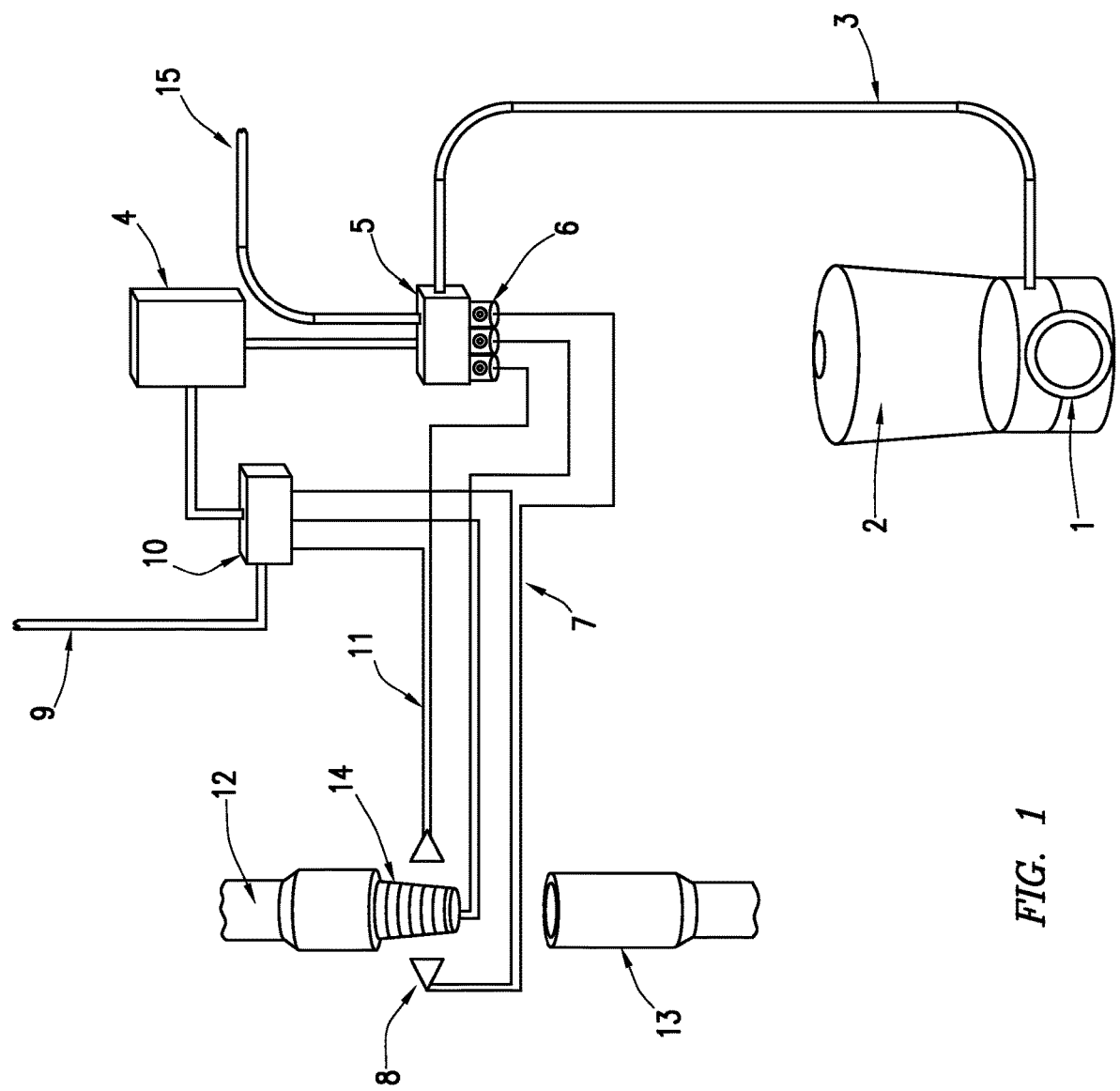
FIG. 1 is a block-diagram of an automated pipe doping apparatus consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a block diagram of an automated pipe doping apparatus consistent with at least one embodiment of the present disclosure. In some embodiments, pipe dope may be pumped by pump 1 from reservoir 2 through dope supply line 3 to manifold 5. Pump 1 may be a rotary driven hydraulic pump, reciprocating piston pump, or, as would be appreciated by one skilled in the art with benefit of this disclosure, any pump capable of pumping the potentially highly viscous pipe dope. Reservoir 2 may in some embodiments be a drum.

In some embodiments, manifold 5 may couple supply line 3 to ejectors 6. Ejectors 6 may be controlled by controller 4. Ejectors 6, as understood in the art, may be positioned to dispense a controlled volume of pipe dope in a certain time period as directed by controller 4. In some embodiments, ejectors 6 may also be coupled to power source 15 which may be a hydraulic or pneumatic high pressure system. Power source 15 may be adapted to increase the pressure of pipe dope as it is dispensed by ejectors 6. Power source 15 may be driven, for example and without limitation, by a positive displacement pump such as a piston driven pump (not shown). The volume of pipe dope dispensed by ejectors 6 may be selected based on, for example, the size and geometry of the threaded section 14 of the drill pipe 12 to which pipe dope is to be applied. The volume of pipe dope dispensed by ejectors 6 may be varied by, for example and without limitation, varying the amount of pipe dope supplied to ejectors 6, varying the pressure of power source 15 and/or supply lines 3, or varying the diameters of one or more of supply line 3 and distribution lines 7.

Pipe dope dispensed by ejectors 6 may then flow through pipe dope distribution lines 7 to pipe dope applicators 8. In some embodiments, each pipe dope applicator 8 may be coupled to a single ejector 6, as shown in FIG. 1.

In some embodiments, the automated pipe doping apparatus may include an environmental compensation system. The environmental compensation system may be adapted to, for example and without limitation, compensate for adverse environmental conditions such as, for example, extreme cold or heat. In each condition, flow of the pipe dope may be adversely affected. For example, depending on the environmental conditions, the pipe dope may increase in viscosity to an undesirable extent. In some embodiments, one having ordinary skill in the art with the benefit of this disclosure will understand that pipe dope may be overly viscous in standard conditions as well. In some embodiments, a system of heating elements may be positioned on one or more of pump 1, reservoir 2, dope supply line 3, manifold 5, ejectors 6, dope distribution lines 7, and dope applicators 8 to, for example and without limitation, warm the components and ensure desired pipe dope flow in cold environments. In some embodiments, similar apparatuses, such as cooling fins, fans, heat exchangers, etc. may similarly be used to vary the temperature of the pipe dope.

Figure 2B:
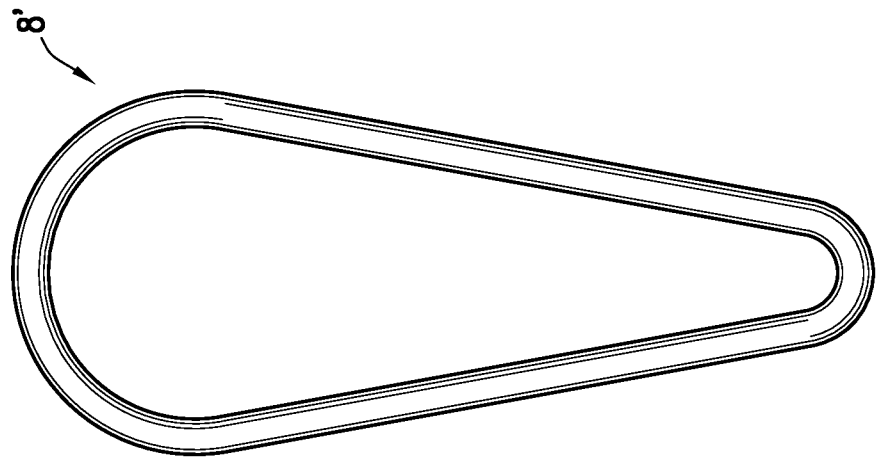
FIGS. 2A, 2B depict nozzles consistent with embodiments of the present disclosure.
Figure 2A:
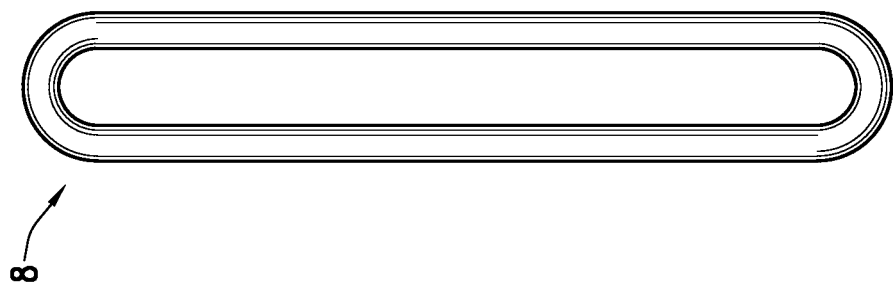

In some embodiments, pipe dope applicator 8 may be a fan-type applicator. As depicted in FIG. 1, pipe dope applicator 8 may be generally triangular when viewed from the side. Applicator 8 may be flattened, as depicted in FIG. 2A, forcing escaping pipe dope to be ejected in a "fan" pattern towards threaded section 14. In some embodiments, as depicted in FIG. 2B, pipe dope applicator 8' may include a taper to, for example, eject more pipe dope at the wide end of pipe dope applicator 8' than at the narrow end. Such an arrangement may be useful where threaded section 14 is likewise tapered as depicted in FIG. 1.

In some embodiments, as depicted in FIG. 1, multiple pipe dope applicators 8 may be positioned about threaded section 14. During drilling operations, in some embodiments, pipe dope applicators 8 may be retracted from threaded section 14 in some embodiments. In some embodiments, pipe dope applicators 8 may remain about drill pipe 12 as operations commence. During a make-up operation, threaded section 14 may be aligned with pipe dope applicators 8. Pipe dope may be ejected by ejectors 6, through pipe dope distribution lines 7 and may be flowed through pipe dope applicators 8. Pipe dope applicators 8 may then apply the pipe dope onto threaded section 14. In some embodiments, drill pipe 12 may be rotated during this procedure, allowing, for example, even coverage of threaded section 14 with pipe dope.

In some embodiments, pipe dope applicator 8 may include a self-cleaning system as depicted in FIG. 1. The self-cleaning system may utilize a high-pressure system to force excess pipe dope out of applicator 8. In some embodiments, the self-cleaning system may utilize a hydraulic or pneumatic system as depicted in FIG. 1. In some embodiments, cleaning system supply line 9 may carry high-pressure air to cleaning system manifold 10. When commanded, for example, by controller 4, cleaning system manifold 10 may allow, for example and without limitation, high-pressure air to flow through cleaning system distribution lines 11 to pipe dope applicators 8. The high-pressure air may then dislodge and eject any excess pipe dope from pipe dope applicators 8.

Figure 3A:
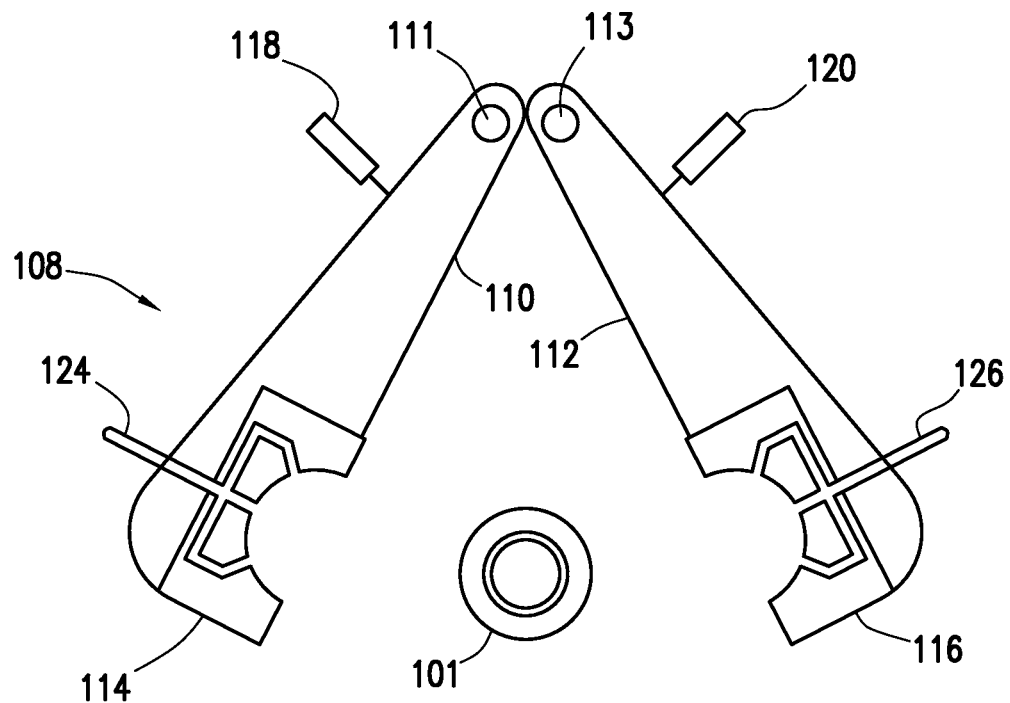
FIGS. 3A, 3B depict an alternate automated pipe doping apparatus consistent with embodiments of the present disclosure.
Figure 3B:
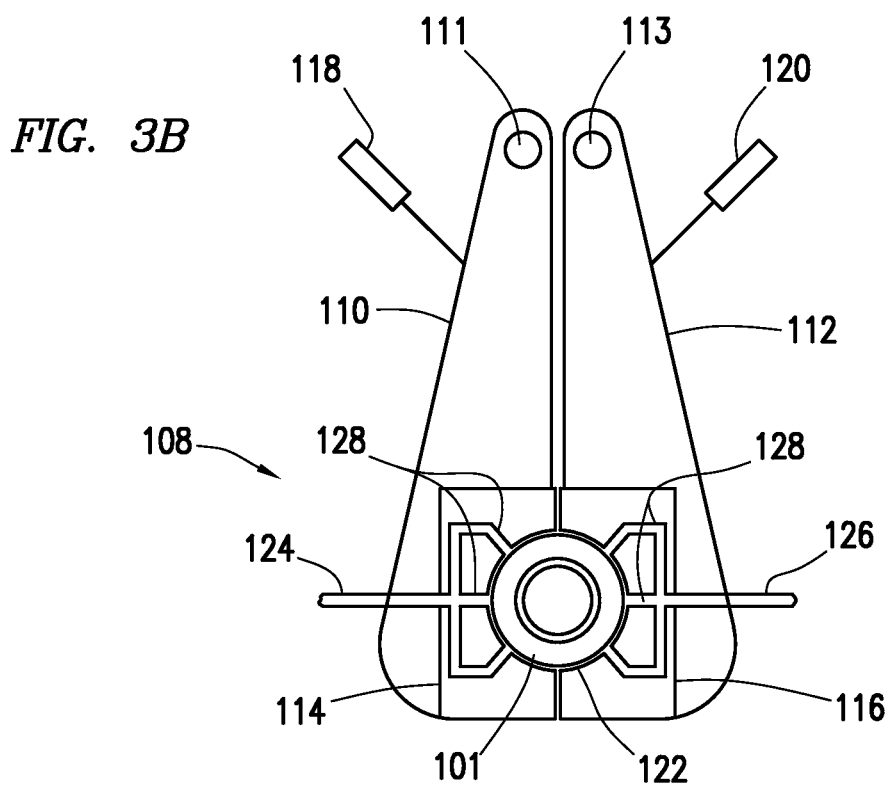

In some embodiments, rather than a spray-type applicator, a mold-applicator may be used. As depicted in FIGS. 3A-B, pipe dope applicator 108, in some embodiments, may include a first and second articulating arm 110, 112. Each of the articulating arms 110, 112 may include die half 114, 116, positioned to close about threaded connection 101 as articulating arms 110, 112 are actuated. Articulating arms 110, 112 are depicted in FIGS. 3A, 3B as pivoting about pivot pins 111, 113, such that articulating arms 110, 112 intersect around threaded connection 101. In some embodiments, not shown, articulating arms 110, 112 may instead extend laterally from either side to close die halves 114, 116, such as by a linear actuator (not shown). One having ordinary skill in the art with the benefit of this disclosure will understand that articulating arms 110, 112 may be extended in any way including, for example and without limitation, by hydraulic pistons 118, 120 (as shown), electric motors, etc.

In some embodiments, articulating arms 110, 112 may be held in a retracted configuration as in FIG. 3A when not in use. Articulating arms 110, 112 as well as die halves 114, 116 may be held out of the way of the drill string as it is used downhole. During a make-up operation, the threaded connection 101 may be positioned between die halves 114, 116. Articulating arms 110, 112 may then be actuated, and die halves 114, 116 close about threaded connection 101, forming a closed mold cavity 122. Pipe dope may then be flowed into mold cavity 122 through pipe dope supply lines 124, 126. In some embodiments, pipe dope may flow through ducts 128 formed in the interior of die halves 114, 116. In some embodiments, the pipe dope used may be selected such that the pipe dope, due to its material properties including but not limited to its consistency, viscosity, and wetting properties, may adhere to threaded connection 101 and, in some embodiments, generally retain the shape of mold cavity 122 as articulating arms 110, 112 and die halves 114, 116 are retracted. By varying the shape and size of mold cavity 122, a selected amount of pipe dope may be applied to threaded connection 101. Furthermore, since mold cavity 122 is closed through the entire flowing operation, pipe dope waste and loss may be minimized.

Figure 4A:
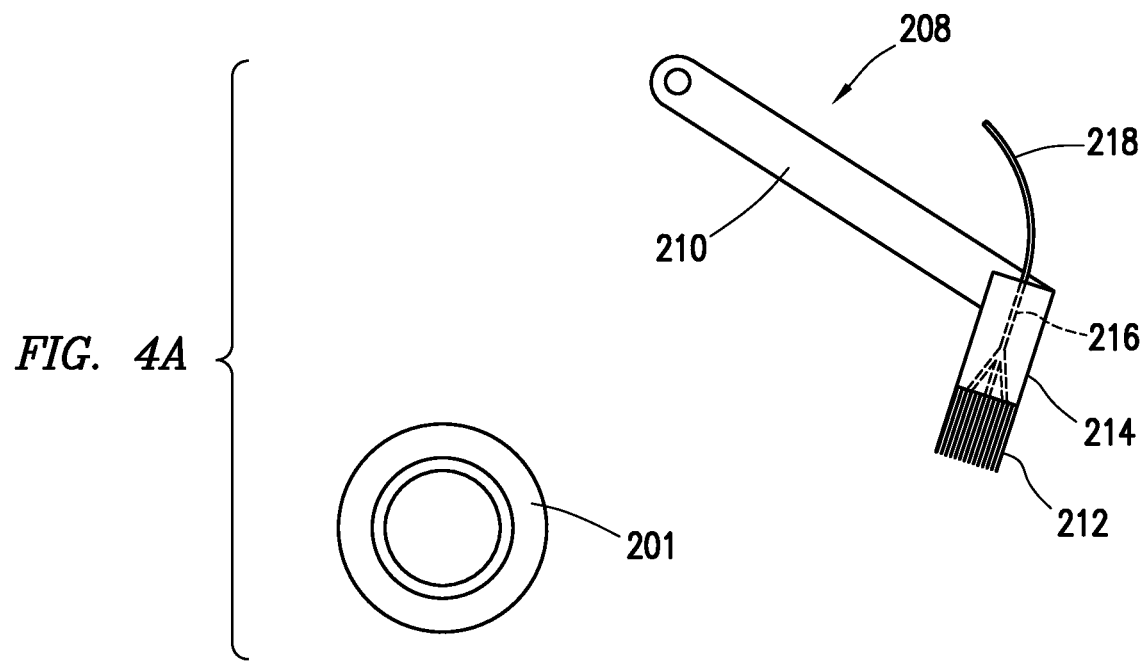
FIGS. 4A, 4B depict an alternate automated pipe doping apparatus consistent with embodiments of the present disclosure.
Figure 4B:
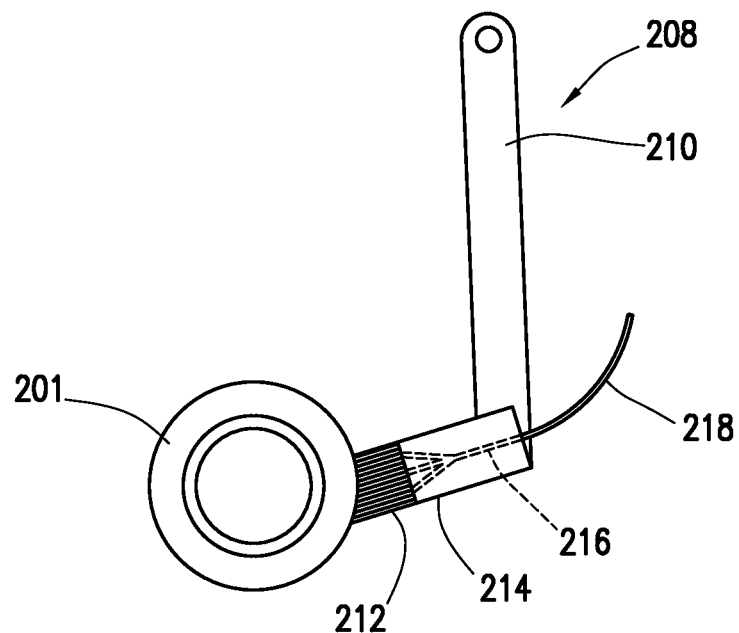

In some embodiments, a brush-type applicator may be used. As depicted in FIGS. 4A-B, pipe dope applicator 208 may include an articulating arm 210. Brush 212 may be positioned at the end of articulating arm 210. Brush 212 may be coupled to articulating arm 210 by brush head 214. Brush 212 may be, for example and without limitation, a bristle brush (as depicted), a foam brush, a roller brush, or any other brush as understood in the art. Brush 212 may be formed from a durable material which is generally nonreactive to the chemicals in the pipe dope as well as other fluids encountered on a drill floor. In some embodiments, pipe dope may be pumped through brush head 214 through ducts 216 from pipe dope supply line 218. Pipe dope may exit brush head 214 near the ends of brush 212. Brush 212 may thus be saturated with pipe dope. In some embodiments, pipe dope may be sprayed onto brush 212 by one or more spray applicators (not shown).

In some embodiments, articulating arm 210 may be held in a retracted configuration as shown in FIG. 4A when pipe dope applicator 208 is not in use. Articulating arm 210 as well as brush 212 may be held out of the way of the drill string as it is used downhole. During a make-up operation, the threaded connection 201 may be positioned at the same height as brush 212. Articulating arm 210 may then be actuated, and brush 212 may come into contact with threaded connection 201. Pipe dope may then be flowed onto brush 212, and then onto threaded connection 201 as it is rotated. In some embodiments, the pipe dope used may be selected such that the pipe dope, due to its material properties including but not limited to its consistency, viscosity, and wetting properties, may adhere to threaded connection 201. Once a sufficient amount of pipe dope has been transferred, articulating arm 210 and brush 212 may be retracted. By varying, for example, the flow rate, brush geometry and composition, rotation rate, and number of rotations, a selected amount of pipe dope may be applied to threaded connection 201. Furthermore, since brush 212 is in contact with threaded connection 201 during the entire flowing operation, pipe dope waste and loss may be minimized.

In some embodiments, the pipe doping apparatus, as described herein, may be used as an independent device. In other embodiments, the pipe doping apparatus may be used as a part of an iron roughneck. In such an embodiment, the pipe doping apparatus may be controlled electronically by the same control system as the iron roughneck, thus allowing "hands-free" operation of the pipe doping apparatus.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A pipe doping system for applying a pipe dope to external threads of a pin end member, the system comprising:
   a controller,
   an iron roughneck,
   a pump fluidly coupled to a reservoir,
   a plurality of pipe dope applicators,
   a dope manifold, wherein the pump is positioned to pump the pipe dope from the reservoir to the dope manifold, the reservoir containing the pipe dope;
   ejectors coupled to the dope manifold, each of the ejectors positioned to supply a controlled volume of the pipe dope from the dope manifold to one of a plurality of dope distribution lines in a time period directed by the controller,
   each of the plurality of pipe dope applicators is fluidly coupled to one of the plurality of the dope distribution lines and positioned to deposit the pipe dope on the external threads, each of the pipe dope applicators being located apart from one the ejectors at an opposite end of one of the plurality of the dope distribution lines, wherein each of the pipe dope applicators includes: a nozzle positioned to receive a flow of the pipe dope from one of the dope distribution lines and apply the pipe dope onto the external threads, and wherein the pipe doping system and the iron roughneck are controlled by the controller.

2. The pipe doping system of claim 1, further comprising a power source coupled to the ejector, the power source adapted to increase the pressure of the pipe dope as the pipe dope is dispensed by the ejector.

3. The pipe doping system of claim 2, wherein the power source comprises a pneumatic or hydraulic system configured to increase the pressure of the pipe dope as supplied by the ejector.

4. The pipe doping system of claim 1, wherein the nozzle is in the form of a flattened triangle when viewed from the side, so that the pipe dope is applied onto the external threads in a fan-shaped pattern.

5. The pipe doping system of claim 4, wherein the nozzle is tapered so that the fan-shaped pattern includes more of the pipe dope at the wider end of the nozzle than the narrower end of the nozzle.

6. The pipe doping system of claim 1, further comprising an applicator cleaning system, the applicator cleaning system comprising a cleaning system manifold positioned to selectively transmit air to the pipe dope applicator through the pipe dope distribution lines, the air serving to eject any excess of the pipe dope from the pipe dope applicator.

7. The pipe doping system of claim 6, wherein the cleaning system manifold is a pneumatic manifold.

8. The pipe doping system of claim 1, further including a temperature compensator coupled to at least one of the pump, the reservoir, the dope manifold, the ejector, the dope distribution line, or the pipe dope applicator, wherein the temperature compensator comprises a heating element.

9. The pipe doping system of claim 1, further including a temperature compensator coupled to at least one of the pump, the reservoir, the dope manifold, the ejector, the dope distribution line, or the pipe dope applicator, wherein the temperature compensator comprises at least one of a cooling fin, fan, or heat exchanger.

10. The pipe doping system of claim 4, wherein the fan-shaped pattern includes a wide end and a narrow end.

\* \* \* \* \*